United States Patent [19]

Reikowski

[11] 4,396,569

[45] Aug. 2, 1983

[54] METHOD OF DUPLICATING SHAPES AND FINISHES

[75] Inventor: Harold J. Reikowski, Southfield, Mich.

[73] Assignee: Kelsey-Hayes Company, Romulus, Mich.

[21] Appl. No.: 314,540

[22] Filed: Oct. 26, 1981

[51] Int. Cl.³ .............................................. B29G 5/00
[52] U.S. Cl. .................................. 264/137; 264/227; 264/553; 264/554
[58] Field of Search ................ 264/137, 227, 553, 554

[56] References Cited

U.S. PATENT DOCUMENTS 3,871,060 3/1975 Ladney .............................. 264/338
3,929,956 12/1975 Jakobsen et al. ..................... 264/137
4,230,656 10/1980 Amin et al. .......................... 264/553

Primary Examiner—Maurice J. Welsh
Attorney, Agent, or Firm—Ralph J. Skinkiss; William P. Hickey

[57] ABSTRACT

A method of duplicating shapes embodying resinous material and more particularly fiber reinforced resinous material is taught. The method includes the formation of a mold separation sheet conforming to the mold contours, placing the separation sheet within the mold and charging the mold with the desired resinous mixture. Upon curing of the resinous mixture and ejection of the article from the mold the separation sheet is removed and discarded.

11 Claims, 5 Drawing Figures

METHOD OF DUPLICATING SHAPES AND FINISHES

TECHNICAL FIELD

The present invention relates to inexpensive means for reproducing complicated shapes and finishes; and more particularly, to such means as it relates to the art of filament winding, and the molding of plastic materials generally.

BACKGROUND OF THE INVENTION

Filament winding of complicated shapes is carried out by depositing a strand under tension in the cavities of a mold designed to hold the deposited strand in the desired shape. The strand is wrapped around and around the same cavities of the mold until the desired thickness of strand is deposited. Usually the strand is completely wetted out with a binder before it is wound into the cavities of the mold, but the invention is not limited in this respect. As the binder wetted strand is pulled down into the mold, excess binder exudes into the spaces between the wrappings of the strand and also into contact with the surfaces of the mold. The binder is then caused to harden in the mold to bind the fibers together and hold them in the desired shape. Binders will usually stick to the surface of the mold, and the art has long mitigated the mold sticking problem by incorporating mold release agents into the binders. The mold release agents appear to function by rising to the external surfaces of the binder as it agglomerates, to thereby coat the surface of the mold.

Another problem which occurs in the filament winding art, is that it is impractical for the most part, to incorporate fibers crosswise to the windings for the purpose of binding the windings together. Separation of the windings therefore is prevented almost entirely by the binder, and its attachment to the filaments of the strand. For this reason, the strength of the binder may be more critical in filament wound parts than in other types of fiber reinforced parts.

A still further problem exists in the process of filament winding in that the molds are usually rotated while a "finger" positions the strand in the proper location relative to the mold's cavities. The tension on the binder wetted strand, in conjunction with the rotation of the mold, causes excess binder to flow out of the mold cavities over other surfaces of the mold, including its separating and clamping surfaces. This excess resin has proved costly to remove.

Also in the commercial production of filament wound parts, a considerable time period is spent winding the strand into the cavities of the mold. To achieve volume production, therefore, it is necessary to have a large number of such molds, not only for the winding operation, but to support the wound part during the time that the binder is hardening. In the case where the binder is a thermosetting resin, the mold with a wound part therein is moved to an oven and heated to approximately 350° F. to cause the binder to harden. During this time, another mold will have been placed in the winding machine and another part formed. The molds are usually made of a cast aluminum, or other metal, to withstand the temperature and handling; and the cost of producing and machining the complicated shapes of the mold is appreciable.

DESCRIPTION OF THE PREFERRED EMBODIMENTS

According to some of the aspects of the present invention, the mold release agent in the binder can be reduced or eliminated by placing a sheet of mold release agent over the surfaces of the mold. The sheet of release agent may be formed in situ, but this is time consuming, and is preferably made of a sufficiently thick sheet that it can be formed in a separate operation and be placed in the mold. It has been found that not only is this practical, but that it can be made to provide a smoother finish to the parts made therefrom than is obtained if the parts are made directly on the mold surfaces. This in turn can be utilized to effect certain economies in the making of molds, provided steps are taken to correct for size variations that occur during the process of making the sheet of release agent. Certain broad steps in applicant's process are depicted diagrammatically in FIG. 1, and some of these steps, are shown more fully in FIGS. 2 through 5 as they relate to the filament winding of a steering wheel for an automotive vehicle.

Figure 1:
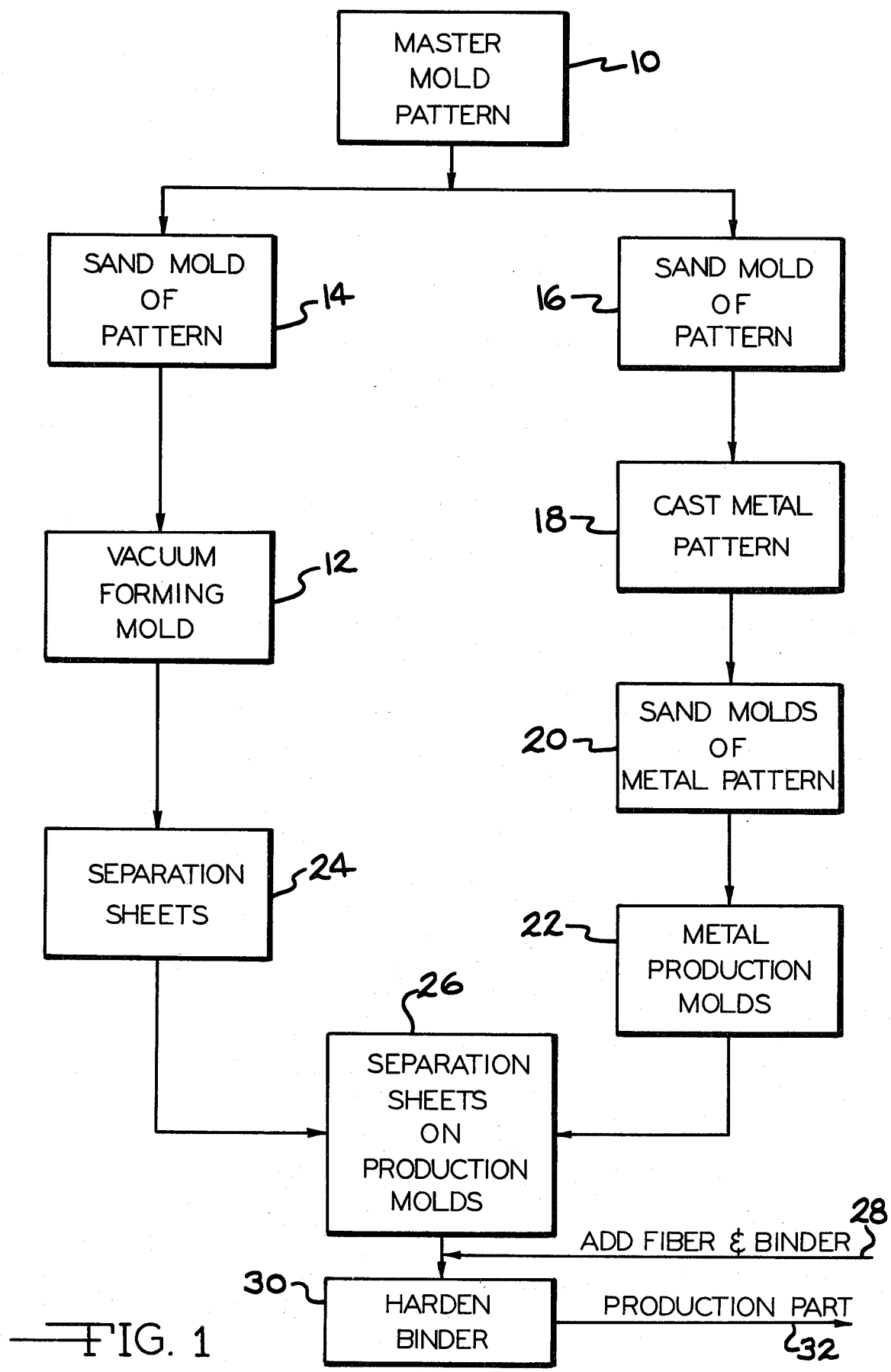
FIG. 1 is a block diagram indicating steps involved in a preferred embodiment of the invention for producing and using filament winding molds.

In the embodiment of applicant's process depicted in FIG. 1, polypropylene is used as the mold release-separation sheet, and cast aluminum is used for the production molds. Polypropylene sheets after being removed from the vacuum forming mold shrink by 0.020 inch per inch. Cast aluminum, during cooling from the molten casting temperature, shrinks approximately one eighth of an inch per foot. The precise amount of shrinkage of the cast aluminum can be controlled to some degree by the particular alloy used, the casting temperature, etc. The polypropylene sheet that is to be used is 0.025 inch thick, and it has been determined that it stretches to a thickness of 0.015 inch during vacuum forming. With this in mind, a master pattern 10 is made of wood, or other easily shaped material, with its filament winding cavities being 0.030 inch wider, and 0.015 inch deeper than the part desired. The overall dimensions of the filament winding cavities are ¼ inch per foot larger than the desired production part, since it turns out that the polypropylene shrinks, or can be made to shrink by this amount.

The vacuum forming mold 12 can be made in any one of a number of different ways. In the process diagrammed in FIG. 1, an accurate sand mold 14 is made of the master pattern 10. Vacuum tubes are laid into the cavity of the sand mold, and the cavity is filled with a metal powder filled, plastic which has a very small shrinkage during solidification. The vacuum forming mold 12 will only be very slightly smaller than the master pattern 10. Holes are drilled from the appropriate surfaces of the plastic to the vacuum tubes, and the surfaces are given a high polish.

The master pattern 10 is also used to make the production molds. In the process diagrammed, an accurate sand mold 16 is first made and molten aluminum is cast therein to produce a cast aluminum pattern 18. After cooling the aluminum pattern 18 will have shrunk by approximately ½ of the desired amount necessary to match the shrinkage of polypropylene. The aluminum pattern 18 is checked for surface and size. If acceptable, an accurate sand mold 20 is made from it, and cast aluminum is poured into it—this time under conditions intended to give the remaining necessary shrinkage to end up with a mold on which the vacuum forming separation sheet will fit. For any large scale production of filament wound parts, a large number of production molds 22 are necessary; and it is intended that a large number of sand molds 20 will first be made from the cast metal pattern 18, and that the necessary production molds 22 will be obtained therefrom.

An advantage of applicant's method of molding is that the separation sheets 24 will retain the high finish of the vacuum forming mold 12. The metal production molds 22, when removed from the sand molds 20, will have surface irregularities arising from the depressions between sand grains. It has been found that in filament winding, the separation sheets 24 are not forced down into these surface irregularities and therefore, no expensive machining or polishing operation need be performed on the production molds 22.

Filament wound parts are made by placing a vacuum formed separation sheet 24 on a production mold 22 as shown at 26 and installing the necessary filament retaining plates on the top side edge of the mold's filament retaining cavities. A strand wetted out with catalyzed polyester prepolymer, or other suitable prepolymer, is positioned by a finger opposite the mold's filament retaining cavities; and either the mold is rotated to lay the strand into the cavity, or the finger is moved to lay the strand into the cavity. This operation is depicted at 28 and is explained in detail in prior art patents so that it need not be explained further here, except as such a process coacts with applicant's sheet of mold release 24. The mold with the filament windings therein is placed in an oven at approximately 350° F. to harden the binder as depicted at 30; and thereafter, the mold is opened to release the production part, as depicted at 32.

Figure 2:
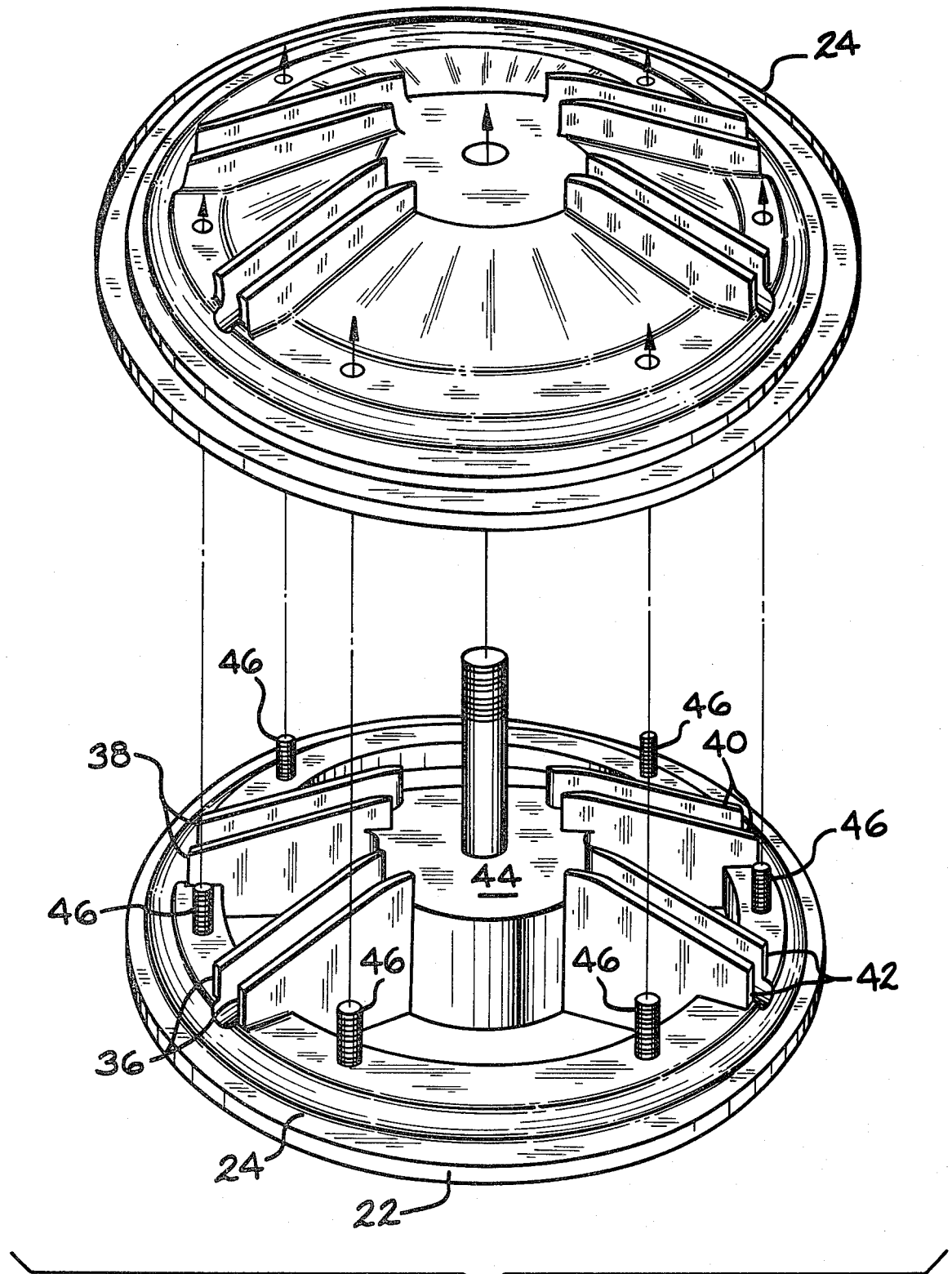
FIG. 2 is an exploded view showing a release sheet of the present invention as positioned for mating with a mold constructed according to other aspects of the present invention.
Figure 3:
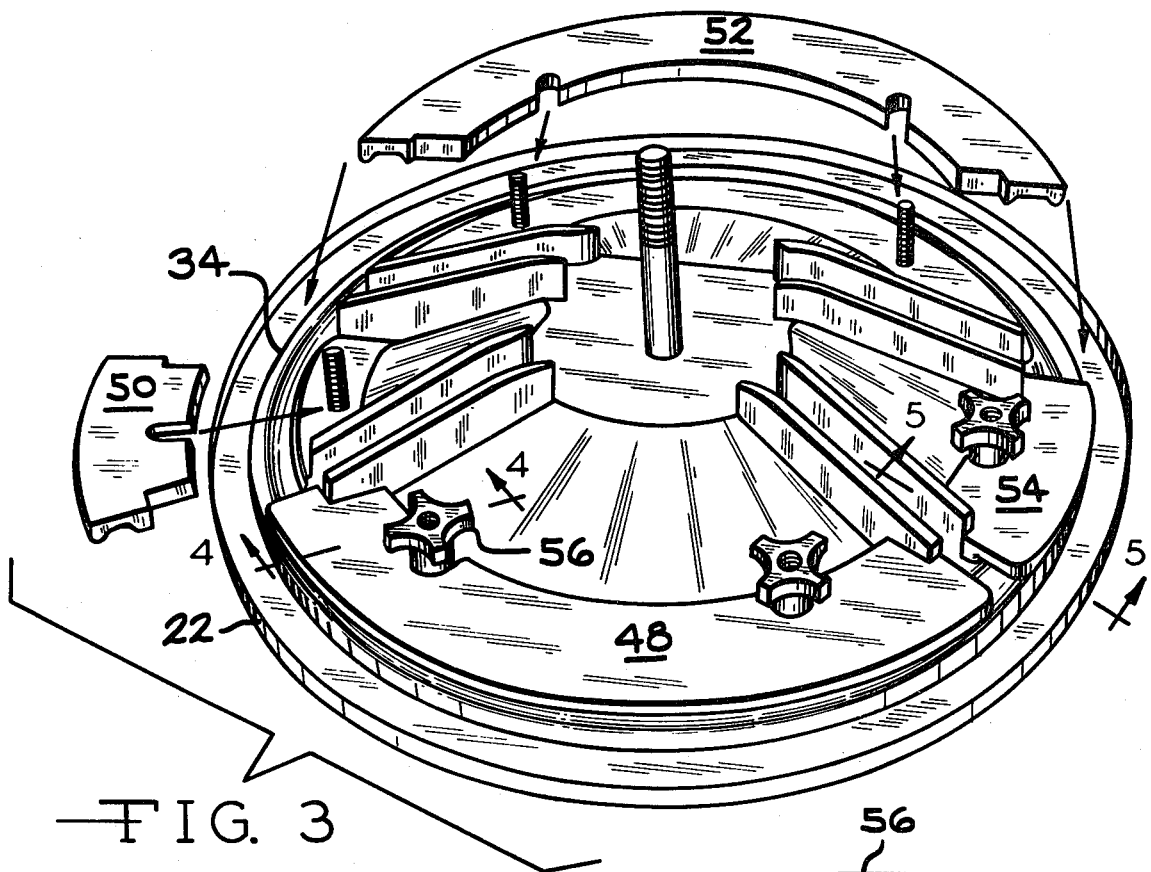
FIG. 3 is an oblique exploded view of the assembly made as indicated by FIG. 2 with certain hold down segments positioned for installation to complete the filament winding mold.
Figure 4:
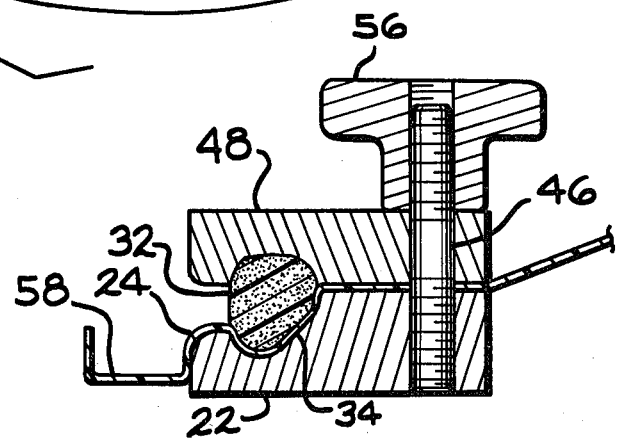
FIG. 4 is a fragmentary sectional view taken approximately on the line 4—4 of FIG. 3.
Figure 5:
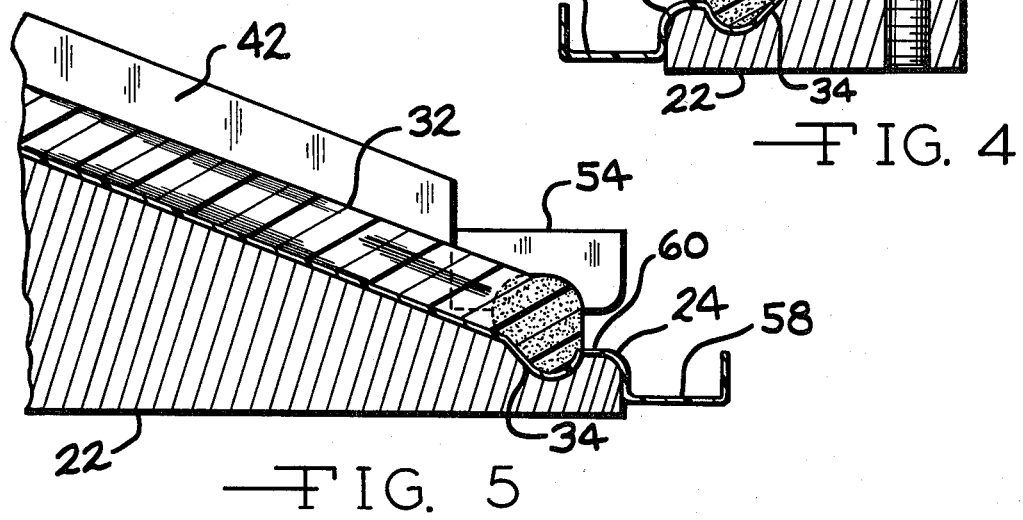
FIG. 5 is a fragmentary sectional view taken approximately on the line 5—5 of FIG. 3.

Referring to FIGS. 2 through 5, there is shown therein a sheet of mold release and matching mold parts for producing a filament wound steering wheel of an automotive vehicle. FIG. 2 shows a filament winding mold 22 having an annular rim forming groove 34 opening outwardly of its periphery. Four pairs of vertical guides 36, 38, 40 and 42 extend generally radially from a hub supporting plateau 44 to the rim groove 34 to provide respective channels for building the rim supporting arms of the steering wheel. Six studs 46 project vertically from the base of the mold just radially inwardly of the groove 34 for retaining the segmental plates 48, 50, 52 and 54 which provide the top wall of the rim groove 34. Suitable wing nuts 56 are threaded onto the studs 46 to clamp the segmental cover plates 48 through 54 in place. Before the segmental cover plates are slipped into position, however, a mold release sheet 24 of vacuum formed polypropylene is slipped down over the studs 46 and mated with the surfaces of the mold 22. Referring to sections 4 and 5, it will be seen that the release sheet 24 is retained by the segmental cover plates 48 through 54, and that it lays down tightly on the surfaces of the mold 22. Also it will be seen that the release sheet 24 has a peripheral resin retaining groove 58 to catch any excess resin that may be thrown from the rim groove 34 during rotation of the mold 22.

The resin retaining groove 58 is made during vacuum forming by an appropriate portion of the vacuum forming mold 12 which was added to the basic shape produced by the sand mold 14 from which the vacuum forming mold 12 was made. A peripheral space 60 exists between the surface of the mold 22 and the segmental cover plates 48 through 54 to receive resin soaked glass strand from a finger, not shown, positioned outwardly of the resin retaining groove 58 as the mold 22 is rotated. Rotation of the mold 22 stops at appropriate times with the finger, not shown, opposite the groove between one of the pairs of vertical guides 36 through 42, following which the finger moves inwardly between the guides to the center. Upon reaching the center, the mold 22 rotates again to wrap the strand around a hub, not shown, following which the finger moves radially outwardly between another pair of vertical guides. This operation is continued until the rim cavity 34 and the arm cavities between the vertical guide plates, shown in sections 4 and 5 are filled with strand. The mold with the resin saturated wound filaments is then moved to an oven held at approximately 350° F. for twenty minutes to harden the binder into the steering wheel armature 32. The hot mold is opened, and the release sheet with the armature 32 is pulled from the surfaces of the heated mold 22, and is allowed to cool.

While FIG. 1 depicts a preferred sequence of steps which will produce release sheets that mate with a production mold, other sequences of steps can be utilized. For those instances where the release sheets shrink at twice the rate of the production molds during cooling, it is possible to build a totally independent vacuum forming mold from scratch which is appropriately larger than the master pattern from which the production molds are made. In the case of polypropylene release sheets, the vacuum forming mold could be made larger than the desired production part by ¼ inch per foot, while the pattern for the production molds is only made ⅛ inch per foot larger than the desired production part. Instead of laying each out independently of each other, however, a production mold can be cut into a number of pieces, say 16, which are then arranged with spaces in between to give overall dimensions which are ⅛ inch per foot larger than the production mold. The pieces can be doweled together using powdered metal filled plastic to fill the spaces, and the mold cavities can then be worked to the proper dimensions.

In another embodiment of the invention, the material from which the vacuum sheets are made is compounded or selected to have the same shrinkage as has the material from which the production mold is made. In this case, only one master pattern need be made, and the production molds can be made from sand molds whose cavities are made by the master pattern itself.

While the invention has been described as having special advantages in making filament winding molds, it is not so limited—nor is it limited to the use of a single release sheet.

I do not wish to be limited to the particular embodiments shown or described, and it is my intention hereby to cover all novel adaptations, modifications, and arrangements thereof which come within the practice of those skilled in the art to which the invention relates and which fall within the purview of the following claims.

I claim:

1. A method of duplicating shapes comprising: producing a master pattern, producing a negative of the master pattern, forming a replica of the master pattern, producing a vacuum forming pattern, producing a vacuum formed separation sheet on the vacuum forming pattern, covering the surfaces of the replica with said vacuum formed separation sheet, packing a plastic material against the vacuum formed separation sheet in said replica mold, and causing said plastic mix to harden.

2. The method of claim 1 wherein said plastic material includes a thermosetting binder, and said plastic material being hardened against said vacuum formed separation sheet.

3. The method of claim 2 wherein said plastic material is a fiber reinforced polyester resin.

4. The method of claim 2 wherein said fiber reinforcement comprises long lengths of parallel side by side fibers.

5. The method of claim 2 wherein said separation sheet is caused to have smoother surfaces than said replica on which it is placed and the hardened plastic mix is caused to take on the smooth surface of said separation sheet.

6. A method of producing parallel fiber reinforced articles comprising: producing a vacuum formed separation sheet to fit a mold for confining the parallel fibers, fitting the separation sheet over surfaces of the mold, placing binder incorporated parallely laid fibers over the surfaces of the separation sheet and hardening the binder against the separation sheet.

7. The method of claim 6 wherein said parallel fibers are wound in situ over the surfaces of said vacuum formed separation sheet.

8. The method of claim 6 wherein said binder is a thermosetting binder.

9. A method of producing molded parts from a plastic material which requires a mold release to prevent the parts from sticking to the mold, comprising: vacuum forming a sheet of mold release agent to conform to the shape of the mold, fitting the vacuum formed sheet onto the molding surfaces of the mold, molding the plastic mix against the separation sheet, and hardening the plastic mix.

10. The method of claim 9 wherein the plastic material contains a thermosetting binder.

11. The method of claim 9 wherein the separation sheet is caused to have a finish that is smoother than the finish of the molding surface of the mold, and the molded parts are caused to have the finish of the separation sheet.

* * * * *